United States Patent [19]

Kincel

[11] 4,219,916
[45] Sep. 2, 1980

[54] BEARING CARTRIDGE MOUNTING METHOD

[75] Inventor: Roger S. Kincel, Whittier, Calif.

[73] Assignee: BASF Aktiengesellschaft, Ludwigshafen, Fed. Rep. of Germany

[21] Appl. No.: 820,569

[22] Filed: Aug. 1, 1977

[51] Int. Cl.³ .............................................. B21D 53/10
[52] U.S. Cl. ........................... 29/149.5 R; 308/237 R; 308/238; 29/149.5 NM
[58] Field of Search .................... 29/148.4 A, 148.4 C, 29/149.5 R, 149.5 DP, DIG. 1, 149.5 NM, 149.5 C, DIG. 35, 148.4 R; 308/238, 237, DIG. 4

[56] References Cited

U.S. PATENT DOCUMENTS

| | | | |
|---|---|---|---|
| Re. 16,210 | 11/1925 | Williams | 29/149.5 R |
| 1,309,388 | 7/1919 | Yeomans | 29/149.5 R |
| 1,346,535 | 7/1920 | Fedden et al. | 29/DIG. 35 |
| 2,531,334 | 11/1950 | Grenat | 29/149.5 R X |
| 3,056,636 | 10/1962 | Mims | 29/148.4 A |
| 3,359,613 | 12/1967 | Rye | 29/460 X |
| 3,419,949 | 1/1969 | Huebner | 29/149.5 R X |
| 4,023,247 | 8/1975 | Baer et al. | 29/149.5 R |

Primary Examiner—Francis S. Husar
Assistant Examiner—V. K. Rising
Attorney, Agent, or Firm—Keil & Witherspoon

[57] ABSTRACT

A method for the precision alignment of bearings and, more particularly, a method of installing sleeve bearings relative to other parts of the apparatus assembly or to other bearings in a manner that will assure the accurate alignment of the axis of the bearing bore. The method comprises the steps of pressing the bearing into an outer sleeve, sizing the inner diameter of the bearing bore, precisely setting the bearing-sleeve assembly on a guide shaft within the housing bore and filling the gap between the sleeve and housing bore with an adhesive.

2 Claims, 2 Drawing Figures

BEARING CARTRIDGE MOUNTING METHOD

INTRODUCTION

The present invention relates generally to a method for the precision alignment of bearings and, more particularly, to a method of installing sleeve bearings relative to other parts of the apparatus assembly or to other bearings in a manner that will assure the accurate alignment of the axis of the bearing bore.

BACKGROUND OF THE INVENTION

Many problems have been encountered in the past when attempting to precisely align the bores of sleeve-type bearings in assembly. Such bearings included sintered metal bearings such as the type known as "Oilite" bearings manufactured by the Amplex Division of Chrysler Corporation and bearings made of fiber, plastic and the like.

Such bearings are generally installed by pressing them into a housing bore formed in the apparatus assembly. Although this method of installation will generally correct the out-of-roundness found with such porus bearings, the resulting bearing assembly will have uncertain inner diameter bore tolerances. If such irregularities in the inner diameter of the bearing are not corrected, the desired friction characteristics of the bearing will be adversely affected due to hot spots developing in use at various points along the inner bore surface.

Therefore, several methods have been developed in order to finish the inner diameter of the bearing bore in order to remove surface irregularities. Such methods include mandrel sizing when pressing the bearing into the housing assembly, burnishing the inner bore with a button or roller-type burnishing tool or machining the inner bore surface of the bearing after it is mounted.

Although the above methods of finishing the inner bore of the bearing provide acceptable results when it is not critical to align the bearing axis with other portions of the apparatus or with other bearings in multiple bearing assemblies, they cannot be practially utilized to laterally and angularly align the finished inner bore axis of the bearing with great precision. This is due to the fact that such bearings are typically available with an inner diameter to outer diameter tolerance of 0.003 inch total indicator reading (TIR). Hence, when it is desired to axially align two of such bearings within the same housing assembly, the axial centers of the inner bores of the bearings may vary as much as 0.006 inch. Therefore, such inexpensive bearings are not generally acceptable for precision uses where the tolerance between a pair of such bearings or with some other part of the apparatus assembly must be maintained at tolerances approaching as much as 0.0001 inch.

Furthermore, it is not possible to align the inner bore axis of such bearings using the mandrel sizing method of installation or by using a burnisher since the mandrel or burnisher will be pushed off center or be displaced at an axial angle by the inner bore diameter tolerance irregularities of the bearings when they are installed within the housing assembly.

Although it is possible to achieve tolerances approaching 0.0001 inch by machining the inner bore of the bearings after they are inserted into the housing assembly, this method of finishing and aligning the bores of the bearings is expensive and not well suited to assembly-line operations. In addition, the accuracy obtainable through machining the bearing bores will also be influenced to some extent by the tolerance irregularities of the inner bore diameters when they are installed within the housing assembly, thereby resulting in a loss of accuracy as the distance between the pair of bearings to be aligned is increased. A further and more important reason why machining the inner bore of the bearings is undesirable is that it tends to "smear" or close off the lubricating pores of the bearing material along the inner bore surface due to the cutting action of the tool, thereby significantly reducing the lubricating ability of the bearing. For this reason, sizing the inner diameter of the bearing through burnishing is much more desirable in that it does not affect the porosity of the bearing.

In order to achieve greater accuracy in bearing alignment, it has also been attempted to set the bearing in a housing bore formed slightly lager than the outer diameter of the bearing and fill the space between the bearing and housing with an adhesive such as epoxy. Before the epoxy sets, the mandrel which has been inserted into the bearing inner bore is precisely axially aligned with respect to other bearings or other parts of the apparatus assembly.

Although this method of aligning bearings offers certain advantages in assembly, many problems have arisen with its use. For example, it has been found that the epoxy chemically reacts with the lubrication in the bearing thereby contaminating it. In addition, it is extremely difficult to obtain good adhesion between the bearing and the epoxy due to the film of lubricant which inherently is present on the outer surface of the porous bearing. Furthermore, since the bearing is not press fit within the housing bore, once the alignment mandrel is removed, the inner diameter of the bearing bore will spring back into its original irregular shape thereby not assuring full and even surface contact between the bearing and the shaft with which it is to be utilized.

BRIEF DESCRIPTION OF THE INVENTION

The present invention eliminates the above-described problems found with conventional alignment methods by providing an efficient, inexpensive and highly accurate method of precisely aligning the axis of such sleeve bearings. The method comprises the steps of pressing the bearing into an outer sleeve, sizing the inner diameter of the bearing bore, precisely setting the bearing-sleeve assembly on a guide shaft within the housing bore and filling the gap between the sleeve and housing bore with an adhesive.

Since the bearing is completely surrounded by the outer sleeve, there is no contamination of the bearing lubricant by the adhesive and good adhesion between the sleeve and housing bore can be easily obtained. In addition, the sleeve, which may be made of standard aluminum tubing, provides heat sinking for the bearing in operation.

Furthermore, since the bearing-sleeve assembly becomes essentially a stock part, they can be easily inspected on an assembly-line basis for inner diameter tolerances of the bearing bore. Unlike the prior art method of setting the bearing with epoxy directly in the housing, the bearing of the present invention is press fit within the outer sleeve and therefore may be sized to tolerances of 0.0001 inch very easily by roller burnishing or the like without the undesirable spring-back problem encountered with the prior art epoxy setting method.

Since the bearings of the present invention are aligned with respect to the guide shaft placed through their bores, they may be aligned with respect to other parts of the machine assembly rather than with respect to the housing bore as is the case with bearings which are press fit within the housing. Likewise, since the bearing-sleeve assembly is set within the slightly larger housing bore with no more than finger pressure force, there is no deformation of the housing during assembly and lateral tolerances between the two bearings or with respect to other parts of the machine assembly may be held very close since there is no lateral spring back as with press fit bearings.

A further important advantage of the present invention is that the bearing-cartridge assembly may be set into materials other than metal since it is simply aligned and epoxyed within the larger housing bore. In addition, the bearing-cartridge assembly may be more easily removed from the housing bore for servicing than bearings that have been press fit within the housing bore.

DESCRIPTION OF THE PREFERRED EMBODIMENT

Figure 1:
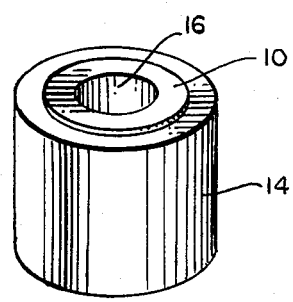
FIG. 1 is a perspective view of a bearing-sleeve assembly constructed in accordance with an embodiment of the present invention.
Figure 2:
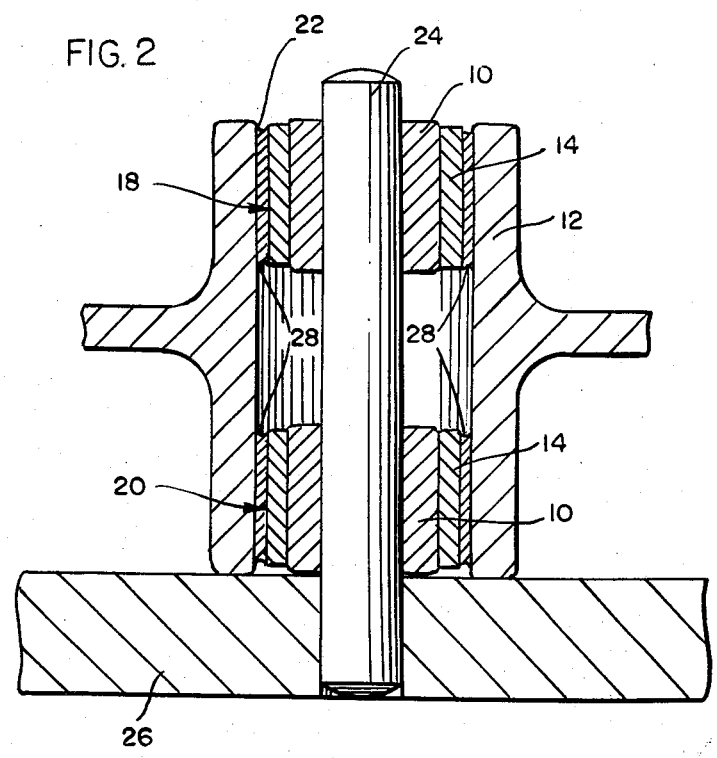
FIG. 2 is a side sectional view of two of the bearing-sleeve assemblies illustrated in FIG. 1 shown as mounted in a housing.

FIGS. 1 and 2 illustrate an embodiment of a sleeve bearing 10 mounted in a housing 12 in accordance with the method of the present invention. The bearing 10 is first press fit within sleeve 14 using standard mounting methods. Sleeve 14, which may be made of aluminum tubing or some other suitable metal, is cut to a length corresponding to the length of bearing 10 prior to installation therein.

After bearing 10 is mounted within sleeve 14, the inner bore diameter 16 of the bearing is sized to the desired tolerances by utilizing a mandrel sizing or burnishing tool. Since the bearing has first been press fit within sleeve 14 before sizing, the finished inner diameter of the bearing bore will maintain its sized tolerances after the sizing tool has been removed from therein.

After the press fitting and sizing operations have been completed the bearing-sleeve assembly illustrated in FIG. 1 essentially becomes a stock part which may be easily inspected for tolerance specifications and stored until needed on the machine assembly line.

FIG. 2 illustrates two bearing-sleeve assemblies 18 and 20 which have been inserted within the bore 22 of housing 12. The bearing-sleeve assemblies are precisely set within the bore of the housing through use of a guide shaft 24 which is fitted within the inner bores of the bearings. In this manner, guide shaft 24 which is mounted on a fixture base 26 is utilized to precisely align the axis of bearing-sleeve assemblies 18 and 20 with respect to each other and/or with respect to some other portion of the machine assembly. Since the bearing-sleeve assemblies are fit within the oversized bore 22 of housing 12 by no more than finger pressure, it is also possible to maintain the lateral distance between the end surfaces of the bearings or with respect to other parts of the machine within close tolerances.

After the bearings are set and aligned within housing bore 22, the gap between the inner surface of the housing and the outer surface of sleeve 14 are filled with an adhesive 28, such as an epoxy or anaerobic adhesive, which will fix the bearings at their predetermined aligned positions within the housing. Of course, the housing bore inner diameter must be sufficient to tolerate all dimensional variations of the assembly without influencing the desired position of the bearing-sleeve assembly.

Once the adhesive has cured, guide shaft 24 is removed thereby leaving the bearing predictably aligned and ready for use with no subsequent machining being required. Since the tolerance of guide shaft 24 may be easily maintained at 0.00005 inch and the inner bore of the bearings may be burnished to a tolerance of 0.0001 inch, the centerline concentricity of the two bearings may be maintained within ±0.0001 inch or greater through use of the present inventive method without utilization of any sophisticated tooling or assembly line methods.

While a particular embodiment of the present invention has been shown and described in detail, it should be understood that various obvious changes and modifications thereto may be made, and it is therefore intended in the following claims to include all such modifications and changes as may fall within the spirit and scope of this invention.

I claim:

1. A method of installing and locating a sleeve bearing within the bore of a housing relative to other parts of the apparatus or to other bearings in said apparatus in a manner that will assure the accurate orientation of the axis of the bearing bore, said method comprising:
   pressing the bearing into an outer sleeve, which sleeve has an outer diameter smaller than the inside diameter of the housing bore;
   sizing the inner diameter of the bearing bore;
   positioning the bearing bore upon a precision guide mandrel and orienting the assembly of the bearing, the outer sleeve and the mandrel within the housing bore;
   filling the gap between the outer surface of said sleeve and the inside diameter of said housing bore with an adhesive;
   curing said adhesive while maintaining the previously determined orientation of the axis of the bearing bore relative to said other parts of the apparatus or to said other bearings; and
   removing said guide mandrel from said bearing bore.

2. A method of installing and locating a sleeve bearing within the bore of a housing relative to other parts of the apparatus or to other bearings in said apparatus in a manner that will assure the accurate orientation of the axis of the bearing bore, said method comprising:
   pressing the bearing into an outer metallic sleeve, which sleeve has an outer diameter smaller than the inside diameter of the housing bore;
   sizing the inner diameter of the bearing bore with a roller burnishing tool;
   positioning the bearing bore on a precision guide mandrel;
   orienting the assembly of said precision guide mandrel with said bearing and said sleeve within the housing bore;
   filling the gap between the outer surface of said sleeve and the inside diameter of said housing bore with an adhesive;
   curing said adhesive while maintaining the previously determined orientation of the axis of the bearing bore relative to said other parts of the apparatus or to said other bearings; and
   removing said guide mandrel from said bearing bore.

* * * * *